United States Patent [19]

Khan et al.

[11] Patent Number: 5,356,540
[45] Date of Patent: Oct. 18, 1994

[54] PUMPABLE AQUEOUS SLURRIES OF SEWAGE SLUDGE

[75] Inventors: Motasimur R. Khan, Wappingers Falls; Christine C. Albert, Peekskill, both of N.Y.

[73] Assignee: Texaco Inc., White Plains, N.Y.

[21] Appl. No.: 702,579

[22] Filed: May 20, 1991

[51] Int. Cl.$^5$ .......................... C02F 11/14; C10J 3/46
[52] U.S. Cl. ..................... 210/758; 210/761; 210/769; 210/774; 48/197 R; 48/197 A; 48/209; 110/342
[58] Field of Search .......................... 44/605, 280–282; 48/197 R, 197 A, 206, 209, 210, 198.1, 198.3; 110/341, 342, 346–348; 210/609, 749, 761, 764, 769, 774, 758

[56] References Cited

U.S. PATENT DOCUMENTS

| | | | |
|---|---|---|---|
| 3,507,788 | 4/1970 | Cole et al. | 210/761 |
| 4,052,176 | 10/1977 | Child et al. | 48/197 R |
| 4,242,098 | 12/1980 | Braun et al. | 44/51 |
| 4,615,807 | 10/1986 | Haines et al. | 210/764 |
| 4,762,527 | 8/1988 | Beshore | 44/51 |
| 4,875,906 | 10/1989 | Apel | 44/197 R |
| 4,933,086 | 6/1990 | McMahon et al. | 210/761 |
| 5,211,723 | 5/1993 | Khan | 48/197 R |
| 5,217,625 | 6/1993 | Khan et al. | 210/761 |
| 5,230,211 | 7/1993 | McMahon et al. | 60/39.02 |
| 5,264,009 | 11/1993 | Khan | 48/197 R |

Primary Examiner—Thomas Wyse
Attorney, Agent, or Firm—Jeffrey M. Greenman

[57] ABSTRACT

A pumpable aqueous slurry of sewage sludge as produced by the steps of (1) dewatering sewage sludge to produce an aqueous slurry having a solids content of about 10 to 25 wt. %; (2) pretreating said aqueous slurry of sewage sludge to improve its slurrying characteristics by one or a combination of (a) heating, (b) hydrothermal treatment, and (c) heating, mixing and shearing; and (3) mixing the following materials together at a temperature in the range of about ambient to 400° F. to produce a pumpable aqueous slurry having a solids content in the range of about 30 to 65 wt. %: (a) pretreated aqueous slurry of sewage sludge; (b) a nonionic water soluble alkoxylated alkylphenol additive; and (c) sewage sludge-containing material and/or solid carbonaceous fuel-containing material to increase the solids loading.

31 Claims, No Drawings

PUMPABLE AQUEOUS SLURRIES OF SEWAGE SLUDGE

FIELD OF THE INVENTION

This invention relates to pumpable aqueous slurries of sewage sludge or mixtures of sewage sludge and solid carbonaceous fuel e.g. coal and/or petroleum coke with increased solids content.

1. Description of Related Art

Sewage sludge may be gasified in a partial oxidation process described in coassigned U.S. Pat. No. 3,687,646. Upgrading aqueous slurries of sewage sludge by shearing without heating is described in coassigned U.S. Pat. No. 4,933,086. Agglomerating the organic matter in aqueous slurries of sewage sludge by heating, is described in coassigned U.S. Pat. No. 4,983,296. However, none of these references taken singly or in combination, teach or suggest the subject invention in which the nonionic organic additive specified herein is mixed with sewage sludge as pretreated herein and with or without solid carbonaceous fuel. The slurrability and solids content of the mixture are substantially improved.

SUMMARY OF THE INVENTION

In accordance with the invention there is provided a pumpable aqueous slurry of sewage sludge as produced by:

(1) dewatering sewage sludge to produce an aqueous slurry having a solids content of about 10 to 25 wt. %;

(2) pretreating the aqueous slurry of sewage sludge from (1) to improve its slurrying characteristics; and (3) mixing the following materials together at a temperature in the range of about ambient to 400° F. to produce a pumpable aqueous slurry having a solids content in the range of about 30 to 65 wt. %:

a. pretreated aqueous slurry of sewage sludge from (2);

b. a nonionic water soluble alkoxylated alkylphenol additive; and c. sewage sludge-containing material and/or solid carbonaceous fuel-containing material.

DESCRIPTION OF THE INVENTION

With landfills closing, ocean dumping being curtailed, and high-technology incinerators becoming unpopular in many areas, communities are finding that it is getting increasingly more difficult and expensive to dispose of their sewage sludge. Pumpable aqueous slurries of sewage sludge or mixtures of sewage sludge and solid carbonaceous fuel are made by the subject process containing high concentrations of sewage sludge. These pumpable slurries may be used as a fuel in a partial oxidation gas generator and may be thereby disposed of without contaminating the atmosphere. A nonpolluting hot raw effluent gas stream comprising at least one of the following is produced: synthesis gas, reducing gas and fuel gas. In one embodiment, the slurry may be burned by complete combustion in a boiler thereby producing by-product steam and hot water. Alternatively, the pumpable slurry may be incinerated or used as fuel in a furnace. A nonionic additive comprising a water soluble alkoxylated alkylphenol is included in the slurry fuels to improve the slurrability and to increase the solids content.

The term "sewage sludge" as used herein may be broadly defined as "water-carried wastes", particularly from municipal sanitary sewage lines, containing at least one of the following: body wastes (excreta), household wastes, community waste such as street washings, etc., and industrial wastes and sludges. The total solids content of the sewage in municipal lines is usually about 500 parts per million (p.p.m.) or more. The solids in sewage are mostly animal or vegetable substances, "organic matter" i.e., fats carbohydrates, and proteins. Some mineral or inorganic constituents present include sand and clay, as well as the common mineral salts found in the water supply. Sewage sludge is obtained from raw sewage and may contain a number of pathogens known to be health hazards to humans. Almost any type of organism may be found in sewage, including bacterial, protozoa, spores and cysts.

The parts by weight of supplemental carbonaceous fuel to dewatered sewage sludge are respectively in the range of about 5-7 to 0.5-7, such as about 6:2. The slurry of sewage sludge and alkoxylated alkylphenol additive, optionally in admixture with supplemental carbonaceous fuel, may be reacted with a free oxygen-containing gas by partial oxidation in a free-flow noncatalytic gas generator. Noxious sewage sludge is safely disposed of by the subject process without polluting the nation's environment. Non-contaminating ash and slag are separated from the gas stream. The ash and slag may be used for road bed fill and for making cement blocks. Further, the subject process allows a greater amount of sewage sludge to be fed to a partial oxidation gasifier, boiler, or incinerator while requiring less energy per unit mass of sewage sludge processed. This process has the following advantages:

(a) Noxious sewage or industrial sludge is disposed of without polluting the environment, and clean fuel gas and/or synthesis gas is produced.

(b) By-product synthesis gas may be used in the catalytic synthesis of organic chemicals e.g. methanol.

(c) The slag produced during the partial oxidation of the mixed feed of sludge and solid carbonaceous fuel is free of pollutants, and is non-hazardous. Further, it is non-leachable.

(d) The process has a high thermal efficiency. Internally generated steam produced in a waste heat boiler may be used to heat the dewatered sewage sludge. The steam may be also used as the working fluid in an expansion turbine.

A typical ultimate analysis of sewage sludge is shown in Table I. A typical ultimate analysis of inert non-combustible materials in sewage sludge is shown in Table II. The higher heating value (BTU/lb) of dry sewage sludge is in the range of about 3000 to 9500.

TABLE I

| TYPICAL ULTIMATE ANALYSIS OF COMBUSTIBLES IN SEWAGE SLUDGE (DRY BASIS) | |
|---|---|
| ELEMENT | WT. % |
| CARBON | 54.6 |
| HYDROGEN | 7.9 |
| NITROGEN | 4.5 |
| OXYGEN | 32.0 |
| SULFUR | 1.0 |

TABLE II

TYPICAL ANALYSIS OF INERT NON-COMBUSTIBLE MATERIALS IN SEWAGE SLUDGE

| ELEMENT | MG/KG DRY SOLIDS |
| --- | --- |
| Total Sodium | 1,515 |
| Water Soluble Sodium (mg/l) | 83 |
| Total Potassium | 800 |
| Water Soluble Potassium (mg/l) | 53 |
| Arsenic | 4.58 |
| Beryllium | 0.38 |
| Cadmium | 3.27 |
| Chromium | 244 |
| Copper | 289 |
| Iron | 150 |
| Lead | 147 |
| Zinc | 468 |
| Nickel | 63 |
| Mercury | 0.68 |

The economics of gasifying sewage sludge depend greatly on the tipping fee received from the sludge generating community and the concentration of sewage sludge that can be included in a pumpable slurry destined for the gasifier. Mixtures of sewage sludge containing about 20 to 50 wt. % of solids and solid carbonaceous fuel e.g. coal that contain sufficient sewage sludge to be profitably burned are ordinarily too viscous to be pumped. This problem and others have been overcome by the subject invention.

Sewage Sludge is obtained from raw sewage by conventional processing steps and equipment. For example, the sewage from municipal sewage lines is passed through bar screens for the removal of large pieces of stone, wood, metal, and other trash which would clog channels or damage pumps. Coarse heavy inorganic noncombustibles, i.e. gravel, cinders, and sand are then settled out in a grit chamber. The sewage is then separated into an aqueous suspension of sewage sludge and liquids. Concentration of the sewage may be accomplished by any suitable way for separating solids and liquids, e.g. gravity settling, filtration, centrifugation, hydroclone, or a combination thereof. For example, a preferable preliminary procedure is to introduce the screened over-flow from the grit chamber into a primary sedimentation tank such as a continuous clarifier as shown in Perry's Chemical Engineers' Handbook, McGraw-Hill, Fourth Edition, 1963, page 19–50. Detention time in the sedimentation tank is sufficient for producing a pumpable aqueous slurry of primary sludge having a solids content of about 0.5 to 20 wt. %, in about 1 to 24 hours. The primary sedimentation tank may also serve as a hold-up tank to even out discontinuities in the sewage composition. Alternatively, a separate holding tank may be used. In one embodiment, a pumpable aqueous slurry of secondary sewage sludge is introduced into the holding tank and mixed with the primary sewage sludge. Secondary sewage sludge has a solids content in the range of about 1 to 10 wt. % and is derived from the liquid overflow from the previously mentioned primary sedimentation tank. The liquid overflow is processed in a conventional manner in order to produce secondary sewage sludge, to reduce the BOD and organic solids content, and to purify and demineralize the waste water which is separated from the secondary sewage sludge. Treatment of the liquid overflow from the primary sedimentation tank may include a combination of any or preferably all of the following steps, depending upon the end use of the water: pH adjustment; reduction of organic solids and BOD to about 20 parts per million or below, preferably by aerated biochemical treatment; clarification, optionally with coagulation; filtration or centrifugation; demineralizing; activated carbon treatment; and disinfection to control bacteria for example by chlorination. Excessively acidic or basic waste waters may be neutralized and the pH adjusted to a level in the range of about 6 to 9. Anaerobic and aerobic biological treatment processes are preferably used to economically abate the bacterial oxygen-consuming pollution caused by the discharge of waste water contaminated with low concentrations of organic matter. Suitable conventional biological processes that may be used include activated sludge units, aerated stabilization basins, and trickling filters. For additional description, see coassigned U.S. Pat. No. 3,687,646, which is incorporated herein by reference.

The purified water may be then used subsequently in the process. For example, it may be used as a coolant of the product gas from the partial oxidation gasifier by direct contact in a quench tank or by indirect heat exchange in a waste heat boiler. By-product steam may be produced after dissolved solids are removed. The hot water or steam may be used for indirect heat exchange with other streams in the subject process. For example, the hot water or steam may be used to preheat and thereby agglomerate the aqueous suspension of sewage sludge. Excess water may be discharged from the system or used externally for industrial applications. The sludge underflow from the primary sedimentation tank comprising primary sewage sludge or from the holding tank comprising primary sewage sludge in admixture with about 0 to 50 wt. % (basis total sewage sludge) of secondary sewage sludge is dewatered further to produce a thickened aqueous suspension.

Preparation of a highly loaded sludge-water slurry with desirable rheological properties requires an understanding of primary sludge characteristics and the relationship of these characteristics to the basic interactions among sludge particles. Since the sludge materials contain numerous chemically active sites, the factors which influence the slurry properties are many.

Sewage sludge is composed of organic and inorganic constituents. It is postulated that the sludge develops a negative charge when dispersed in water (of low ionic concentration). This may be attributable to ionization of carboxylic functional groups present in the sludge. This may cause a difference in electrical potential between the solution and the surface. Because the system as a whole must be neutral, the surface charge is balanced by an opposite charge in the liquid phase.

It is proposed that the forces of interaction affecting the sludge particles include the following: attractive Van der Waals forces and electrostatic repulsion. Van der Waals forces are due to the influence of the dipoles within the particles acting on each other. They are attractive forces and electromagnetic in nature. Electrostatic forces arise from unequal distributions of ions in solution around the particles and their surfaces. The unequal distribution causes one side of the sludge to acquire a net charge of the opposite sign giving rise to a potential across the interface and a so-called electrical double layer. The stability of dispersion can depend upon the degree of electrostatic repulsion. The degree of electrostatic repulsion is dependent on the electrical double layer.

The dewatered pumpable aqueous slurry of sewage sludge having a solids content of about 10 to 25 wt. % is pretreated by at least one of the following procedures depending on the composition of the sewage sludge and preferably c. to improve its slurrying characteristics and solids content:

a. drying the sewage sludge by heating at a temperature in the range of about 100° F. to 900° F. for a period in the range of about 1 to 120 minutes, and a pressure in the range of about 1 to 5 atmospheres;

b. heating in a reaction zone at a temperature in the range of about 200° F. to 600° F. in the absence of air for a residence time of about 1 to 120 minutes and at a pressure of at or above the vapor pressure of water at said elevated temperature;

c. heating and mixing at a temperature in the range of about ambient to 230° F. and at a shear rate of at least 30 per minute for a period in the range of about 0.1 to 180 minutes.

Thus, one way to improve the slurrying characteristics of the dewatered sewage sludge is by heat treating the sewage sludge at a temperature in the range of about 200° F. to 600° F. in the absence of air for about 1 to 120 minutes and at ambient atmospheric pressure and at a pressure which is at or above the vapor pressure of water at the heat treating temperature to produce a pumpable aqueous slurry of sewage sludge. The dewatered sewage sludge is preferably heated by direct or indirect heat exchange in an autoclave. For example, hot water, steam or partially cooled synthesis gas produced downstream in the process may be passed in direct or indirect heat exchange with the sewage sludge. Heat treating the sewage sludge at a temperature in the range of about 200° F. to 600° F. as previously described causes decarboxylation and dehydrogenation of the sewage sludge. The physical nature of the sewage sludge is changed by this hydrothermal treatment. For example, the gel structure is broken down and the water affinity of the sludge solids is reduced. Denaturation reactions occur and the organic hydrophilic sewage material is converted to a hydrophobic material. Sewage sludge with a particle size in the range of about 5 to 20 microns is thereby achieved. Pumpable aqueous slurries of sewage sludge having a greater solids contents are thereby produced. Off-gas from the reactor e.g. autoclave comprising $CO_2$, $H_2O$, $H_2S$ and COS is sent to a conventional odor control unit or disinfecting zone. Noxious gases are thereby safely disposed of without polluting the nation's environment.

Heating and mixing for example at elevated temperature e.g. 200° F. is a very effective way to improve the slurrying characteristics and solids content of dewatered sewage sludge having a solids content of about 10 to 25 wt. %. For example, a homogeneous pumpable slurry of sewage sludge having a viscosity of about 400 to 2,000 centipoise at 200° F. and a solids content in the range of about 30 to 65 wt. % may be produced by shearing the dewatered sewage sludge by means of a conventional shearing device at a temperature in the range of about ambient to 230° F. For example, the dewatered sewage sludge having a solids content in the range of about 10 to 25 wt. % may be sheared in a mixing vessel by means of a propeller-type agitator at a shear rate of at least 30 per minute, such as about 700 to 2000 rev. per minute for a period of about 0.5 to 180 minutes. Heating and shearing of sewage sludge is treated in coassigned U.S. Pat. Nos. 4,933,086 and 4,983,296, which are incorporated herein by reference.

The profit that can be made from the subsequent burning of the pretreated sewage sludge is determined by the percentage of sewage sludge in the feed to the partial oxidation gasifier; or, alternatively in the feed to the furnace, boiler, or incinerator. Gasification of sewage sludge alone is not very efficient, as the heating value of sewage sludge is very low compared to other fuels such as coal. Mixtures of sewage sludge and coal and/or petroleum coke improve the overall heating value of the slurry. Gasification of such mixtures are thereby rendered highly viable. Accordingly, the solids content of the pretreated aqueous slurry of sewage sludge is increased by mixing with it at least one of the following materials: sewage sludge-containing material and/or a solid carbonaceous fuel-containing material. The sewage sludge-containing material is selected from the group consisting of dried sewage sludge having a solids content in the range of about 75 to 99 wt. %, aqueous slurry of sewage sludge having a solids content in the range of about 15 to 70 wt. %, and mixtures thereof. The solid carbonaceous fuel-containing material is an aqueous slurry of coal and/or petroleum coke having a solids content in the range of about 30 to 70 wt. %, dried coal and/or petroleum coke having a solids content in the range of about 75 to 100 wt. %, and mixtures thereof. The aforesaid sewage sludge-containing material and/or solid carbonaceous fuel-containing material are mixed with the pretreated sewage sludge and the alkoxylated alkylphenol additive to produce a pumpable aqueous slurry having a solids content in the range of about 30 to 65 wt. %. The term "coal" as used herein is intended to mean a material selected from the group consisting of anthracite, bituminous, lignite, residue derived from coal liquefaction, shale, asphalt, and mixtures thereof.

It was unexpectedly found that the preparation of this mixture may be facilitated by including from about 0.05 to 2 wt. % (basis wt. of mixture) of nonionic water soluble alkoxylated alkylphenol additive. The additive may be mixed with one or more of said other ingredients. For example, from about 30 to 70 parts by wt. of pretreated aqueous slurry of sewage sludge is mixed with about 0.05 to 2 parts by wt. of said nonionic alkoxylated alkylphenol additive. The remainder of the pumpable aqueous slurry comprises about 28 to 68 parts by wt. of a high-solids containing supplemental fuel. The solids loading of the mixture is thereby increased. For example, dried sewage sludge and/or solid carbonaceous fuel-containing material are added to the other ingredients. Alternatively all three ingredients may be simultaneously mixed together. The aforesaid mixing of the ingredients takes place at a temperature in the range of about ambient to 400° F. The term "and/or" is used herein in its normal sense. For example, "A and/or B" means either A, B, or A and B.

The dried sewage sludge is prepared by drying dewatered sewage sludge to a solids content in the range of about 75 to 99 wt. %. Advantageously, waste heat streams from downstream in the process may be used to dry the sewage sludge, such as steam produced in the gasifier waste heat boiler. The solid carbonaceous fuel-containing material has a solids content in the range of about 50 to 100 wt. % and may comprise dry solid fuels such as coal and/or petroleum coke, or aqueous slurries of coal and/or petroleum coke.

The nonionic water soluble alkoxylated alkylphenol additive has an average molecular weight in the range of about to 6,000 and the following structural formula:

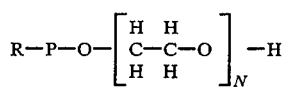

wherein:
R is an alkyl group with 5 to 20 carbon atoms,
P—O is a phenolic moiety in which O is oxygen, and
N equals 5 to 100.

Preferably, R equals $C_9H_{19}$ and N equals 55.

The following advantages are offered for including methanol in the pumpable aqueous slurry product. For example, from about 30 to 90 wt. % (basis wt. of additive) is mixed with said alkoxylated alkylphenol additive prior to mixing the additive with the other ingredients.

(1) Methanol will act as an anti-freeze during storage and transport during the winter season.

(2) Methanol will increase the heating value of the slurry and may eliminate the need to preheat the oxygen and fuel feedstream.

(3) Low cost low grade methanol may be used as the slurry medium.

(4) The overall pumpable solids loading for petroleum coke and sewage sludge was increased significantly from 59.5 wt. % to over 63 wt. % at an apparent viscosity of 1,000 cp when the aqueous slurrying medium included 50% methanol as the carrier.

Compounds of iron and/or calcium, silica, and mixtures thereof, e.g., ferric oxide, lime, calcium carbonate or acetate may be added in the amount of about 0.1 to 20.0 wt. % (basis weight of mixture) to sludge, sludge-coal or sludge-coke mixture to (1) effect sludge dewatering, (2) improve slurrying, (3) remove undesirable metals, e.g., CO, CU, NI, V, MN, CR or ZN, (4) act as a sulfur scavenger, (5) facilitate ash/slag removal from the gasifer and/or (6) improve coal char or coke gasification characteristics.

In a preferred embodiment, the fuel feedstream, for example the aqueous slurry of sewage sludge and coal and/or petroleum coke and a stream of free-oxygen containing gas are introduced into a free-flow unobstructed down-flowing vertical refractory lined steel wall pressure vessel where the partial oxidation reaction takes place. A typical gas generator is shown and described in coassigned U.S. Pat. No. 3,544,291, which is incorporated herein by reference.

The burner assembly is inserted downward through a top inlet port of the noncatalytic synthesis gas generator. The burner extends along the central longitudinal axis of the gas generator with the downstream end discharging a multiphase mixture of fuel, free-oxygen containing gas, and temperature moderator directly into the reaction zone.

A three or four stream annular type burner, such as shown and described in coassigned U.S. Pat. Nos. 3,847,564 and 4,525,175, which are incorporated herein by reference, may be used to introduce the feedstreams into the partial oxidation gas generator. For example, with respect to U.S. Pat. No. 3,847,564, free-oxygen containing gas may be simultaneously passed through the central conduit 18 and outer annular passage 14 of said burner. The free-oxygen containing gas is selected from the group consisting of substantially pure oxygen i.e. greater than 95 mole % $O_2$, oxygen-enriched air i.e. greater than 21 mole % $O_2$, and air. The free-oxygen containing gas is supplied at a temperature in the range of about 100° F. to 1000° F. The aqueous slurry of sewage sludge coal and/or petroleum coke is passed through the intermediate annular passage 16 at a temperature in the range of about ambient to 650° F.

The weight ratio of $H_2O$ to carbon in the feed is in the range of about 0.2 to 3.0, such as about 1.0 to 2.0. The atomic ratio of free-oxygen to carbon in the feed is in the range of about 0.8 to 1.4, such as about 1.0 to 1.2. Advantageously, the high amount of combined oxygen in the sewage sludge reduces the amount of free-oxygen.

The relative proportions of solid or liquid fuels, water and oxygen in the feedstreams to the gas generator are carefully regulated to convert a substantial portion of the carbon in the fuel e.g., up to about 90% or more by weight, to carbon oxides; and to maintain an autogenous reaction zone temperature in the range of about 1800° F. to 3500° F. Preferably the temperature in the gasifier is in the range of about 2200° F. to 2800° F., so that molten slag is produced. Further, the dwell time in the reaction zone is in the range of about 1 to 10 seconds, and preferably in the range of about 2 to 8 seconds. With substantially pure oxygen feed to the gas generator, the composition of the effluent gas from the gas generator in mole % dry basis may be as follows: $H_2$ 10 to 60, CO 20 to 60, $CO_2$ 5 to 40, $CH_4$ 0.01 to 5, $H_2S$+COS 0 to 5, $N_2$ nil to 5, and Ar nil to 1.5. With air feed to the gas generator, the composition of the generator effluent gas in mole % dry basis may be about as follows: $H_2$ 2 to 20, CO 5 to 35, $CO_2$ 5 to 25, $CH_4$ 0 to 2, 1 $H_2S$+COS 0 to 3, $N_2$ 45 to 80, and Ar 0.5 to 1.5. Unconverted carbon, ash, or molten slag are contained in the effluent gas stream. Depending on the composition and use, the effluent gas stream is called synthesis gas, reducing gas, or fuel gas. Coal has a high ash content e.g. about 10 to 30 wt. %. Advantageously, when coal is used as the supplemental fuel the coal ash will encapsulate the non-combustible materials in the sewage sludge, and the encapsulated material will flow from the reaction zone of the gas generator as substantially inert molten slag.

The hot gaseous effluent stream from the reaction zone of the synthesis gas generator is quickly cooled below the reaction temperature to a temperature in the range of about 250° F. to 700° F. by direct quenching in water, or by indirect heat exchange for example with water to produce stream in gas cooler. The gas stream may be cleaned and purified by conventional methods. For example, reference is made to coassigned U.S. Pat. No. 4,052,176, which is included herein by reference for removal of $H_2S$, COS, and $CO_2$.

Although modifications and variations of the invention may be made without departing from the spirit and scope thereof, only such limitations should be imposed as are indicated in the appended claims.

We claim:

1. A pumpable aqueous sewage sludge composition having a solids content of about 30-65 wt. %, comprising a sewage sludge containing material with about 0.05 to 2.0 wt. % of a nonionic water soluble alkoxylated alkylphenol additive.

2. The sewage sludge composition of claim 1, also including about 28-68 parts by weight of a supplemental carbonaceous fuel containing material.

3. The sewage sludge composition of claim 1, also including a supplemental carbonaceous fuel containing material in a proportion of about 5-7 parts by weight fuel to about 0.5-7 parts by weight sewage sludge.

4. The sewage sludge composition of claim 2, wherein the supplemental carbonaceous fuel containing material is selected from the group consisting of an aqueous slurry of coal and/or petroleum coke having a solids content of about 30-70 wt. %, dried coal and/or petroleum coke having a solids content of about 75-100 wt. %, and mixtures thereof.

5. The sewage sludge composition of claim 3, wherein the supplemental carbonaceous fuel containing material is selected from the group consisting of an aqueous slurry of coal and/or petroleum coke having a solids content of about 30-70 wt. %, dried coal and/or petroleum coke having a solids content of about 75-100 wt. %, and mixtures thereof.

6. The sewage sludge composition of claim 1, wherein the sewage sludge containing material is selected from the group consisting of dried sewage sludge having a solids content of about 75-99 wt. %, an aqueous slurry of sewage sludge having a solids content of about 15-70 wt. %, and mixtures thereof.

7. The sewage sludge composition of claim 1, wherein the nonionic water soluble alkoxylated alkylphenol additive has an average molecular weight of about 440 to 6000 and the following structural formula:

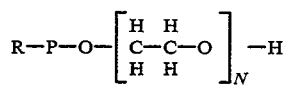

wherein:
R is an alkyl group of 5 to 20 carbon atoms,
P—O is a phenolic moiety in which O is oxygen, and
N equals 5 to 100.

8. The sewage sludge composition of claim 7, wherein R is $C_9H_{15}$ and N is 55.

9. The sewage sludge composition of claim 1, wherein the nonionic water soluble alkoxylated alkylphenol additive contains about 30-90 wt. % methanol, based on the weight of the nonionic additive.

10. The sewage sludge composition of claim 1, also including about 0.1 to 20 wt. % of an additive selected from the group consisting of a compound of iron, a compound of calcium, silica, and mixtures thereof.

11. The sewage sludge composition of claim 10, wherein said additive is selected from the group consisting of ferric oxide, lime, calcium carbonate, calcium acetate, and mixtures thereof.

12. An improved process for preparing an aqueous sewage sludge composition having a solids content of about 30 to 65 wt. %, comprising:
(a) dewatering a first sewage sludge material to produce an intermediate aqueous slurry of sewage sludge having a solids content of about 10 to 25 wt. %;
(b) pretreating the intermediate aqueous slurry of sewage sludge to improve its slurrying characteristics and increase its solids content;
(c) increasing the solids content of the pretreated aqueous slurry of sewage sludge by mixing it with:
(i) at least one material selected from the group consisting of a second sewage sludge containing material, and a solid carbonaceous fuel containing material; and
(ii) about 0.05 to 2 wt. % of a nonionic water soluble alkoxylated alkylphenol additive;
to thereby produce said aqueous sewage sludge composition having a solids content of about 30 to 65 wt. %.

13. The process of claim 12, wherein the aqueous slurry of sewage sludge is pretreated by at least one of the following procedures:
(a) heating at a temperature of about 100° F. to 900° F. for about 1 to 120 minutes and at a pressure at about 1 to 5 atmospheres;
(b) heating at a temperature of about 200° F. to 600° F. in the absence of air for about 1 to 120 minutes at a pressure at or about the vapor pressure of water at said temperature;
(c) heating and mixing at a temperature of about ambient to 230° F. and at a shear rate of at least 30 per minute for about 0.1 to 180 minutes.

14. The process of claim 12, wherein the aqueous sewage sludge comprises about 30 to 70 parts by weight of the first dewatered sewage sludge; about 0.05 to 2.0 parts by weight of said nonionic additive; with the remainder comprising about 28 to 68 parts by weight of sewage sludge-containing material and/or solid carbonaceous fuel-containing material.

15. The process of claim 12, wherein the aqueous sewage sludge is mixed with a supplemental carbonaceous fuel containing material in a proportion of about 5-7 parts by weight fuel to about 0.5-7 parts by weight aqueous sewage sludge.

16. The process of claim 14, wherein the solid carbonaceous fuel-containing material is selected from the group consisting of an aqueous slurry of coal and/or petroleum coke having a solids content of 30-70 wt. %, dried coal and/or petroleum coke having a solids content of about 75-100 wt. %, and mixtures thereof.

17. The process of claim 15, wherein the supplemental carbonaceous fuel-containing material is selected from the group consisting of an aqueous slurry of coal and/or petroleum coke having a solids content of 30-70 wt. %, dried coal and/or petroleum coke having a solids content of about 75-100 wt. %, and mixtures thereof.

18. The process of claim 12, wherein the nonionic water-soluble alkoxylated alkylphenol additive has an average molecular weight of about 440 to 6000 and the following structural formula:

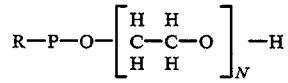

wherein:
R is an alkyl group of 5 to 20 carbon atoms,
P—O is a phenolic moiety in which O is oxygen, and
N equals 5 to 100.

19. The process of claim 18, wherein R is $C_9H_{15}$ and N is 55.

20. The process of claim 12, wherein the nonionic water-soluble alkoxylated alkylphenol additive is contacted with about 30-90 wt. % methanol, based on the weight of the nonionic additive.

21. A process for disposing sewage sludge and recovering valuable by-products, comprising:
(a) dewatering a first sewage sludge material to produce an intermediate aqueous slurry of sewage sludge having a solids content of about 10 to 25 wt. %;

(b) pretreating the intermediate aqueous slurry of sewage sludge to improve its slurrying characteristics and increase its solids content;
(c) increasing the solids content of the pretreated aqueous slurry of sewage sludge by mixing it with:
 (i) at least one material selected from the group consisting of a second sewage sludge containing material, and a solid carbonaceous fuel containing material; and
 (ii) about 0.05 to 2 wt. % of a nonionic water soluble alkoxylated alkylphenol additive;
to produce an aqueous sewage sludge composition having a solids content of about 30 to 65 wt. %; and
(d) disposing the sewage sludge by:
 (i) partial oxidation to produce a gas selected from the group consisting of synthesis gas, reducing gas, fuel gas, and mixtures thereof; or
 (ii) subjecting the sewage sludge to complete combustion.

22. The process of claim 21, wherein the sewage sludge is disposed by partial oxidation to produce a gas selected from the group consisting of synthesis gas, reducing gas, fuel gas, and mixtures thereof.

23. The process of claim 21, wherein the sewage sludge is disposed by subjecting it to complete combustion.

24. The process of claim 21, wherein the aqueous slurry of sewage sludge is pretreated by at least one of the following procedures:
(a) heating at a temperature of about 100° F. to 900° F. for about 1 to 120 minutes and at a pressure at about 1 to 5 atmospheres;
(b) heating at a temperature of about 200° F. to 600° F. in the absence of air for about 1 to 120 minutes at a pressure at or about the vapor pressure of water at said temperature;
(c) heating and mixing at a temperature of about ambient to 230° F. and at a shear rate of at least 30 per minute for about 0.1 to 180 minutes.

25. The process of claim 21, wherein the aqueous sewage sludge comprises about 30 to 70 parts by weight of the first dewatered sewage sludge; about 0.05 to 2.0 parts by weight of said nonionic additive; with the remainder comprising about 28 to 68 parts by weight of sewage sludge-containing material and/or solid carbonaceous fuel-containing material.

26. The process of claim 21, wherein the aqueous sewage sludge is mixed with a supplemental carbonaceous fuel containing material in a proportion of about 5-7 parts by weight fuel to about 0.5-7 parts by weight aqueous sewage sludge.

27. The process of claim 25, wherein the solid carbonaceous fuel-containing material is selected from the group consisting of an aqueous slurry of coal and/or petroleum coke having a solids content of 30-70 wt. %, dried coal and/or petroleum coke having a solids content of about 75-100 wt. %, and mixtures thereof.

28. The process of claim 26, wherein the supplemental carbonaceous fuel-containing material is selected from the group consisting of an aqueous slurry of coal and/or petroleum coke having a solids content of 30-70 wt. %, dried coal and/or petroleum coke having a solids content of about 75-100 wt. %, and mixtures thereof.

29. The process of claim 21, wherein the nonionic water-soluble alkoxylated alkylphenol additive has an average molecular weight of about 440 to 6000 and the following structural formula:

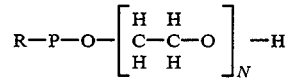

wherein:
R is an alkyl group of 5 to 20 carbon atoms,
P—O is a phenolic moiety in which O is oxygen, and
N equals 5 to 100.

30. The process of claim 29, wherein R is $C_9H_{15}$ and N is 55.

31. The process of claim 21, wherein the nonionic water-soluble alkoxylated alkylphenol additive is contacted with about 30-90 wt. % methanol, based on the weight of the nonionic additive.

* * * * *